United States Patent Office 3,197,524
Patented July 27, 1965

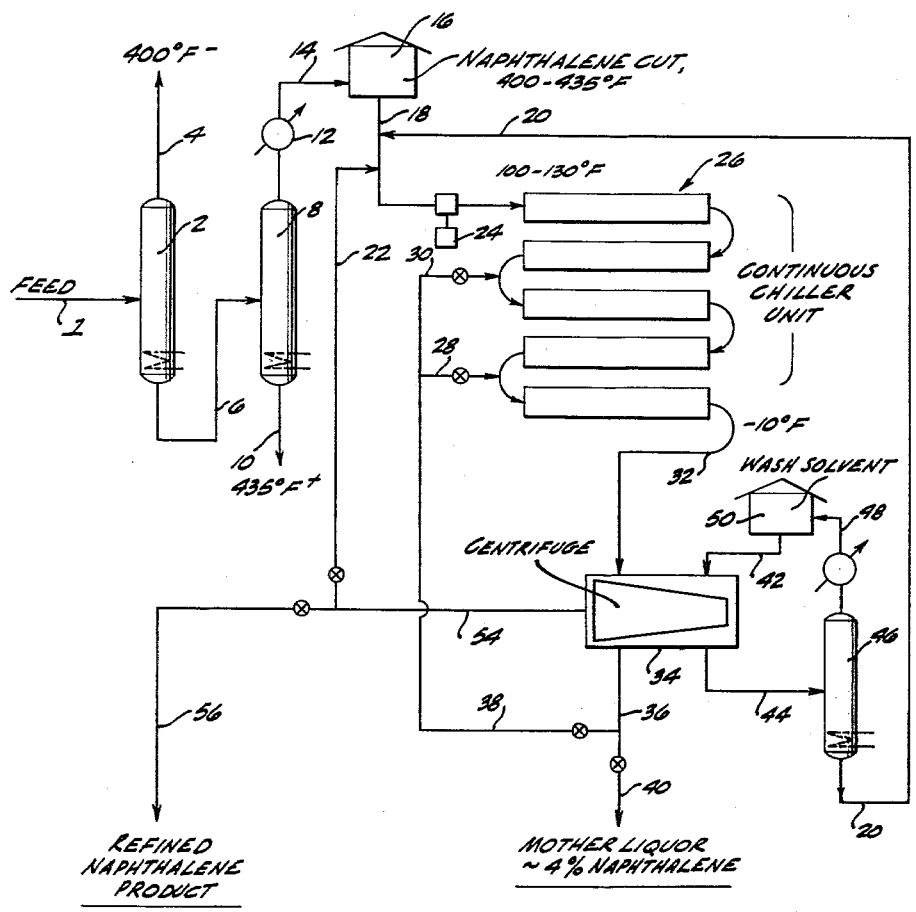

3,197,524
RECOVERY OF PETROLEUM NAPHTHALENE
Peter Stanley Backlund, Anaheim, Calif., assignor to Union Oil Company of California, Los Angeles, Calif., a corporation of California
Filed Nov. 10, 1960, Ser. No. 68,480
9 Claims. (Cl. 260—674)

This invention relates to new methods for the recovery and purification of napthalene contained in small amounts in various hydrocarbon fractions derived from petroleum or the like. Essentially, the method involves a combination of (1) fractional distillation to recover a naphthalene concentrate, (2) adding more naphthalene to the concentrate to render it more suitable for fractional crystallization, and (3) fractional crystallization of naphthalene from the augmented concentrate.

More specifically, in the first step of the process, the petroleum source material is subjected to fractional distillation to isolate a cut boiling between about 390° and 450° F., and preferably between 400° and 435° F. Although this fraction contains substantially all of the naphthalene in the feed, it is still relatively lean, containing usually about 8–25% naphthalene, the remainder constituting other like-boiling hydrocarbons. The naphthalene content of this fraction is then raised to above about 30%, and preferably above 50%, by the addition of naphthalene, either recycled from the process, or added from an extraneous source. The resulting augmented concentrate is then subjected to fractional crystallization, preferably in a continuous, scraped-surface chiller, at a terminal temperature between about $+10°$ and $-50°$ F., preferably about $0°$ to $-20°$ F. The resulting slurry is then treated to separate naphthalene from mother liquor, e.g., in a centrifugal separator, and is preferably washed with, e.g., pentane.

In cases where the feed to the chiller contained more than about 42% of naphthalene, sufficient of the mother liquor recovered from the naphthalene separation step is recycled to at least one point in the scraped surface chiller to maintain a slurry of pumpable consistency so as to prevent clogging in the chiller, but at the same time one which is sufficiently thick to facilitate handling in a basket centrifuge. It has been found that the combination of steps described permits an optimum recovery of 175°–176° F. melting point naphthalene at minimum holding times in the chiller. Without building up the naphthalene content of the feed to the chiller, a similar recovery of pure naphthalene is obtainable only by careful control of crystallization and long holding times in the chiller.

The process of this invention is applicable to many petroleum fractions boiling above about 400° F. Representative examples are fractions derived from catalytic cracking cycle oils, or from heavy naphtha reformate fractions, kerosene extracts, and the products of hydrodealkylation of alkyl-naphthalene fractions derived from petroleum. The recovery of pure naphthalene from such petroleum fractions presents a difficult problem in that they are contaminated mainly with aromatic hydrocarbons such as alkyl-benzenes, tetralins, indanes and the like, all boiling within the 400° to 450° F. range. Solvent extraction methods are difficult and expensive where the contaminants are, as here, mainly aromatic in character, and this is also true of most azeotropic distillation processes. Simple fractional distillation is also impractical because of the close proximity of boiling points of the contaminating hydrocarbons, and also the formation of complex azeotropes. And as indicated above, fractional crystallization is difficult and expensive where the feed to the crystallizer contains less than about 30% by weight of naphthalene, requiring extremely long holding times, and expensive washing steps. Avoiding or minimizing these major difficulties, and providing an efficient and economical fractional crystallization system for purifying these petroleum naphthalene fractions, constitute the principal objectives of this invention.

In conventional scraped-surface, continuous fractional crystallization units, one of the critical economic factors involved is the required feed residence time in the unit. As is readily apparent, a fractional crystallization operation involving a feed residence time of 2 hours will require twice as large a unit for a given production rate than would be needed if the feed required only a 1-hour residence time. Where the objective is to crystallize $99+\%$ pure naphthalene from lean feed liquors containing less than 30% naphthalene, to a point where the naphthalene concentration in the mother liquor is reduced to about 4–5%, it has found that at least about 3 hours' residence time is required in a typical, continuous, scraped-surface chiller. Obviously, this much longer than the time required merely to effect the desired heat exchange. It would be highly desirable to reduce the residence time in the chiller to approximately the required heat-exchange time. It has now been found that, by building up the initial naphthalene content of the feed to the chiller to above about 30% by weight, and preferably above about 50%, the residence time therein can be reduced to between about 15 minutes and 1.5 hours while still obtaining $99+\%$ purity.

Use of these naphthalene-enriched feeds may produce ultimately a relatively thick slurry which may tend to plug the unit. To prevent this, sufficient mother liquor from the crystal separation step is recycled to one or more points in the chiller to maintain a decreasing total naphthalene concentration in the slurry. For example, at the 110° F. point in the chiller, the total naphthalene content should be less than about 60%. At 40° F. it should be less than about 50%, and at $-10°$, less than about 42%. While this recycle technique will of course tend to decrease the feed throughput in the unit, it is found that the net effect is to increase the amount of pure naphthalene recoverable per unit of time in a given unit, as compared to the non-recycle process using feeds containing less than 30% naphthalene, and wherein residence time of the feed is increased three to fivefold, as is generally required.

Reference is now made to the accompanying drawing which illustrates schematically one particular modification of the invention, but is not intended to be limiting in scope. The initial feed to the process, comprising for example the 5% bottoms fraction from a naphtha reformate, is brought in via line 1, and fractionated in column 2 to remove overhead via line 4 the material boiling below about 39° F., and preferably below 400° F. The bottoms product from column 2 is then transferred via line 6 to fractionating column 8, from which all the material boiling above about 450° F., and preferably above about 435° F., is withdrawn as bottoms via line 10. The overhead from column 8 is condensed in condenser 12 and transferred via line 14 to chiller feed tank 16. As recovered from a platformate bottoms fraction, the chiller feed will normally comprise between about 8% and 25% by weight of naphthalene. It will also contain aromatics and naphthenes boiling in the same range including, ordinarily, at least about 10% by weight of alkyl-benzenes and 10% of alkyl-indanes and tetralins. Small amounts of methyl naphthalenes may also be present. Any remaining portion is usually made of paraffins, naphthenes, fluorenes and the like. As previously indicated, this material is poor feedstock to use directly in a fractional crystallization unit, in that careful control and long residence times are required in order to recover pure naphthalene in economical yields.

This chiller feedstock is then withdrawn via line 18 and blended therein with a naphthalene-rich wash liquor from line 20 (derived as hereinafter described), and with recycled product naphthalene from line 22. Sufficient naphthalene is added via lines 20 and 22 to raise the naphthalene content of the chiller feed to above 30% by weight, and preferably above about 50% by weight. The naphthalene-enriched chiller feed, at 100° to 130° F., is then transferred via pump 24 to a continuous, scraped-surface chiller unit 26. These freezing units are conventional in nature, and hence need not be described in detail. In general they consist merely of a bank of tubular conduits containing revolving peripheral blades, much as an ice cream freezer, through which the chiller feed is pumped continuously, the entire unit being in indirect heat exchange with a stream of refrigerant, not shown.

As the chiller feed passes through the freezing unit, crystals of naphthalene are formed progressively, resulting in a slurry being formed which becomes progressively thicker, and thus tends to plug the unit. Where the chiller feed contains less than about 42% by weight of naphthalene this factor does not generally become troublesome. However, where the feed contains more than about 42% of naphthalene, plugging may be encountered before the temperature reaches −10° F. To overcome this problem, crystallization mother liquor (which is saturated at −10° F. with naphthalene) is blended with the circulating slurry downstreamwardly via line 28, sufficient mother liquor being added to reduce the total naphthalene concentration to below about 42% prior to reaching the −10° F. zone. If the initial feed contained 50% or more of naphthalene, mother liquor is added prior to the 40° F. Zone, sufficient being added at this upstream point, e.g., via line 30, to lower the naphthalene concentration to below 50%. Also, where the chiller feed contains more than about 50% of naphthalene, it is normally preferable to add mother liquor incrementally at two or more stages. This provides for maximum capacity of the freezing unit by providing a maximum overall volume-ratio of fresh feed to mother liquor in the unit. It is unnecessary in other words to admit all of the mother liquor recycle to the upstream, warmer portions of the freezing unit, since not all of it is needed until the downstream, colder stages are reached.

In any event, it will be seen that at the outlet of the freezing unit, the slurry will contain between about 30% and 42% by weight of naphthalene. This is the optimum concentration to provide a readily handleable slurry for the subsequent centrifuge separation step. As indicated in the drawing, this slurry is withdraw from the freezing unit via line 32, and will be at a temperature of about 10° to −50° F., preferably about −10° F. The slurry is then transferred to a conventional basket-type centrifuge 34 for separation of mother liquor. In centrifuge 34, the naphthalene filter cake is spun essentially dry of mother liquor, and the mother liquor is taken off via line 36, and a portion thereof may be recycled as previously described via line 38 and lines 28 and 30. The remainder of the mother liquor is withdrawn via line 40, and may be utilized as gasoline blending stock, or subjected to hydrocracking to reduce its boiling range.

As an optional feature, the naphthalene filter cake in centrifuge 34 may be washed with a suitable paraffinic solvent added via line 42. Suitable wash solvents include for example the $C_4$–$C_8$ paraffins, and preferably pentane or hexane. The washing step is ordinarily not required in order to produce naphthalene of 175–176° F. melting point, but is important in reducing the acid-wash color of the naphthalene product. A low acid-wash color is important in many chemical uses to which napthalene is put, as for example in the production of beta-naphthol via sulfonation. The dark color referred to is developed when sulfuric acid is added to the naphthalene, and a standard color test involves adding sulfuric acid to the naphthalene and observing the color of the acid layer. For the chemical uses mentioned, it is generally required that the acid-wash color be below about 10 on the Barrett scale, running from 0 to 15. With a minimal pentane wash, using about 0.1 to 0.4 gram of pentane per gram of naphthalene, it is ordinarily possible to recover naphthalene having an acid-wash color of below about 5.

The wash liquor from the centrifuge, containing some dissolved naphthalene is withdraw via line 44 and transferred to solvent recovery column 46. Solvent is taken overhead via line 48, and sent to storage at 50. The bottoms from column 46, consisting mainly of naphthalene and its associated aromatic impurities is withdrawn as bottoms via line 20 and recycled to line 18 as previously described for recovery of naphthalene.

The purified naphthalene from centrifuge 34 is withdrawn via line 54, and the net product is sent to storage via line 56. As perviously indicated, a portion of the naphthalene, may be recycled, preferably without remelting, via line 22 to build up the naphthalene in the feed to the desired level. Of course, in the event that an extraneous source of naphthalene or naphthalene-rich fractions are available from other sources, it is unnecessary to recycle any of the naphthalene product. For example, the recovery process of this invention may be combined with a hydrodealkylation process wherein the methyl naphthalene bottoms product from fractionation column 8 is sent to a catalytic hydro-dealkylation process to produce a dealkylated product containing, e.g., 50–80% naphthalene. This dealkylated product may be substituted for the naphthalene recycle via line 22.

The following examples as cited to illustrate the critical aspects of the invention, but are not intended to be limiting in scope.

EXAMPLE I

The 5% bottoms fraction from a naphtha reformate (Platformate) was fractionated to recover a napthalene heart-cut boiling between 400° and 445° F., containing 13.3% by weight of naphthalene. About 2,000 grams of this heart-cut was then subjected to slow cooling with agitation in an ice cream freezer until the temperature reached −10° F. The cooling time was 2.4 hours. The resulting slurry was then centrifuged for 20 minutes to recover the naphthalene crystals. The melting point of the crystals was 145° F., indicating a very impure product containing less than 80% naphthalene.

Thus, even with a 2.4 hour cooling period, freezing at −10° F. does not give a commercially saleable naphthalene. Even when the cooling time is increased to 4–5 hours, the product purity is not materially improved. In contrast, the following examples illustrate the improved purity obtainable by increasing the initial naphthalene content of the feed.

EXAMPLE II (A) The naphthalene heart-cut feed of Example I was enriched by the addition of sufficient C.P. naphthalene to raise the total naphthalene content to 27.4% by weight. This material was then chilled as in Example I to −10° F., over a period of 1 hour, and was held at that temperature for 2 hours and then centrifuged. The crystalline product had a melting point of 161° F. and contained 86.3% naphthalene. Upon repeating the experiment wtih a 2-hour freezing time to −10° F. and a ½-hour holding time at that temperature, the melting point was raised only to 164% F., indicating a purity of about 90%.

(B) Another portion of the same naphthalene heart-cut feed was enriched by the addition of sufficient C.P. naphthalene to raise the total naphthalene content to 50%. About 2,000 grams of this mixture was then chilled to −10° F. over a period of 1 hour, with the addition of 400 grams of naphthalene mother liquor at 64–30° F.

The added mother liquor contained about 4% of naphthalene, and was derived from a previous −10° F. crystallization. The melting point of the naphthalene recovered was 170° F., indicating a purity of about 96%.

The purity of this product would seem to be no greater than could be obtained by mixing the added C.P. naphthalene with its aliquot of less than 80% pure naphthalene obtained as in Example I. However, in distinction to such a synthetic mixture, the 96% pure product of this example can be rendered 99.5+% pure by a minimal pentane wash. Thus, by washing the 96% product with 0.2 gram of hexane per gram of product and centrifuging for 15 minutes, a product was obtained having a melting point of 176° F. indicating a 99.8% purity, and an acid-wash color of less than 2.

EXAMPLE III

This example illustrates the results obtainable when using blends of naphthalene-lean fractions with naphthalene-rich fractions derived from the dealkylation of methyl naphthalene reformate fractions.

The naphthalene-lean fraction was the 400°–445° F. reformate cut of Example I, and the naphthalene-rich fraction was obtained by subjecting the 450°–500° F. fraction of reformate to catalytic hydrodealkylation at about 1,050° F., 1 LHSV and 1,000 p.s.i.g., in the presence of added steam and hydrogen, and using a 3% CoO, 9% $MoO_3$, 83% $Al_2O_3$, 5% $SiO_2$ catalyst containing about 1.5% of impregnated sodium hydroxide. The dealkylate was fractionated to recover a 400–450° F. cut containing about 71% naphthalene. Two feed mixtures were prepared containing different proportions of these naphthalene fractions, feed A containing 25% naphthalene and feed B containing 35%.

Each feed mixture was then subjected to fractional crystallization by gradually lowering the temperature of −10° F. over a period of 1 hour with stirring. The respective slurries were then centrifuged to remove mother liquor (containing about 4% naphthalene) and then washed with 0.4 gm. of hexane (Skelly B) per gram of product. Samples were taken after centrifuging the washed products for 1, 2, 4 and 8 minutes. The results were as follows:

Table I

| Centrifuge time, Mins. | Product Analyses | | | |
|---|---|---|---|---|
| | Feed A (25% naphthalene) | | Feed B (35% naphthalene) | |
| | M.P., ° F. | Acid color | M.P., ° F. | Acid color |
| 1 | 159 | >15 | 176 | 10 |
| 2 | 164 | >15 | 175 | 8 |
| 4 | 167 | >15 | 176 | 8 |
| 8 | 169 | >15 | 175.5 | 8 |

It is thus evident that a striking change in the purity of product results from increasing the feed naphthalene content from 25% to 35%. And in all cases, the mother liquor from the −10° F. crystallization contains the same 4–5% of naphthalene.

EXAMPLE IV

This example shows that the results obtained above are not due to a mere seeding of the feed with naphthalene crystals.

A 2,000 gm. portion of the 27.4% naphthalene feed of Example II-A was cooled to 70° F. and seeded with 30 gms. of C.P. naphthalene. The mixture was then cooled to −10° F. over a period of 2 hours. After centrifuging for 20 minutes, the product was found to have a melting point of 163° F., which is indistinguishable from the results obtained without seeding in Example II-A.

Obviously, many variations may be made in the specific feed materials and techniques described above without departing from the essential concept of the invention. The true scope of the invention is intended to be defined by the following claims:

I claim:

1. A process for recovering substantially pure naphthalene from a petroleum fraction boiling between about 390° and 450° F., and containing substantial proportions of alkyl-benzenes and indanes, and containing less than about 30% by weight of naphthalene, which comprises: adding relatively naphthalene-rich material to said petroleum fraction to raise the naphthalene content to above about 50% by weight, then effecting fractional crystallization by reducing the temperature of the resulting mixture to between about 10° and −50° F. over a period of time greater than about 15 minutes and less than about 1.5 hours, separating mother liquor from the resulting naphthalene product, washing said naphthalene product with a minor proportion of a lower paraffin hydrocarbon and recovering from said washing a naphthalene product having an acid-wash color below about 10 on the Barrett scale, said naphthalene-rich material being selected from the class consisting of (1) a portion of said naphthalene product and (2) a dealkylated alkyl naphthalene reformate fraction.

2. A process as defined in claim 1 wherein the fractional crystallization step is carried out continuously by gradually reducing the temperature of a flowing stream of said mixture in a freezing zone while recycling a portion of said mother liquor to at least one point in said freezing zone downstreamward from the feed inlet thereto, so as to produce a final slurry containing less than about 42% by weight of naphthalene.

3. A process as defined in claim 1 wherein said petroleum fraction boils between about 400° and 435° F., and is derived from a naphtha reformate.

4. A process as defined in claim 1 wherein said naphthalene-rich material comprises a portion of said naphthalene product.

5. A process as defined in claim 1 wherein said naphthalene-rich material comprises a dealkylated alkylnaphthalene reformate fraction.

6. A process for recovering substantially pure naphthalene from a wide-boiling-range petroleum source material which comprises, (1) fractionating said source material to recover a naphthalene cut boiling between about 390° and 450° F., containing substantial proportions of alkylbenzenes and indanes, and containing less than about 30% by weight of naphthalene, (2) adding relatively naphthalene-rich material to said petroleum fraction to raise the naphthalene content to above about 50% by weight, (3) effecting fractional crystallization by passing the resulting mixture continuously through an elongated freezing zone with agitation until a terminal temperature between about 0° and −20° F. is reached, (4) controlling the flow-rate of said mixture in said freezing zone to provide a residence time therein greater than about 15 minutes and less than about 1.5 hours, (5) subjecting the resulting slurry to centrifugal separation to separate mother liquor and a 99+% pure naphthalene product, (6) washing said 99+% pure naphthalene product with a minor proportion of a lower paraffin hydrocarbon, and recovering from said washing a final naphthalene product having an acid-wash color below about 10 on the Barrett scale, said naphthalene-rich material being selected from the class consisting of (1) a portion of said naphthalene product, and (2) a dealkylated alkyl-naphthalene reformate fraction.

7. A process as defined in claim 6 wherein said petroleum fraction boils between about 400° and 435° F., and is derived from a naphtha reformate.

8. A process as defined in claim 6 wherein said naphthalene-rich material comprises a portion of said naphthalene product.

9. A process as defined in claim 6 wherein said naphthalene-rich material comprises a dealkylated alkylnaphthalene reformate fraction.

References Cited by the Examiner

UNITED STATES PATENTS

| | | | |
|---|---|---|---|
| 2,163,581 | 6/39 | Boyd | 260—674 |
| 2,295,065 | 9/42 | Vesterdal | 208—263 |
| 2,321,117 | 6/43 | Wilcock | 260—674 |
| 2,686,818 | 8/54 | Smith | 260—674 |
| 2,810,772 | 10/57 | Bennett et al. | 260—674 |
| 2,913,503 | 11/59 | Bozich et al. | 260—666 |

FOREIGN PATENTS

| | | |
|---|---|---|
| 405 | 11/36 | Australia. |
| 812,725 | 4/59 | Great Britain. |
| 522,248 | 2/56 | Canada. |

ALPHONSO D. SULLIVAN, *Primary Examiner.*